United States Patent [19]

Lemelson

[11] Patent Number: 5,563,401
[45] Date of Patent: Oct. 8, 1996

[54] BAR CODES AND METHODS

[76] Inventor: Jerome H. Lemelson, Suite 286, Unit 802 930 Tahoe Blvd., Incline Village, Nev. 89451-9436

[21] Appl. No.: 367,698

[22] Filed: Jan. 3, 1995

[51] Int. Cl.⁶ .................................................... G06K 19/06
[52] U.S. Cl. ................... 235/494; 283/93; 283/67
[58] Field of Search ...................... 235/494, 462, 235/470; 283/82, 93, 72, 81, 67

[56] References Cited

U.S. PATENT DOCUMENTS

| | | | |
|---|---|---|---|
| 4,889,367 | 12/1989 | Miller | 283/81 X |
| 5,153,418 | 10/1992 | Batterman et al. | 235/494 |
| 5,170,044 | 12/1992 | Pastor | 235/494 X |
| 5,189,292 | 2/1993 | Batterman et al. | 235/494 |
| 5,288,986 | 2/1994 | Pine et al. | 235/494 |
| 5,296,693 | 3/1994 | Huges-Hartogs | 235/494 |
| 5,298,731 | 3/1994 | Ett | 235/494 |
| 5,304,787 | 4/1994 | Wang | 235/494 X |
| 5,355,001 | 10/1994 | Fujimoto et al. | 235/494 |
| 5,357,094 | 10/1994 | Baldwin | 235/494 |
| 5,428,211 | 6/1995 | Zheng et al. | 235/494 X |
| 5,468,945 | 11/1995 | Huggett et al. | 235/494 X |

*Primary Examiner*—Frances Han
*Attorney, Agent, or Firm*—J. Kevin Parker

[57] ABSTRACT

Improvements in product and production codes and methods for reading same. In one form a bar code is provided wherein one or more of the individual bars of the code are printed or otherwise formed with coded information recorded therein. The bars may be made of printed matter and either divided into code defining segments or voids therein defining readable auxiliary information. In another form, the bars may be printed of magnetic recording material containing magnetic recordings therein of readable auxiliary information. The auxiliary information may be read when the bars are scanned for their coded information or without scanning the bars for the bar code. Reading may be by scanning a path or paths extending normal or oblique to the bars or in a direction parallel to or longitudinally along one or more of the bars to provided substantial additional information, if needed.

13 Claims, 1 Drawing Sheet

BAR CODES AND METHODS

BACKGROUND AND SUMMARY OF THE INVENTION

Bar codes and similar recording schemes are widely used today to mark objects in order to provide rapidly readable codes containing information relating to the the object such as its identity or price. Such codes usually consist of a series of printed bars of varying widths, similarly and/or differently spaced from each other and arranged to produce a particular reflectivity pattern when the bars are scanned sequentially with a light beam such as laser beam in a direction transverse to the orientation of the bars. The present invention relates to improvements in product or production coding and methods for scanning such coding. In certain applications, it is advantageous to provide in the same area or areas containing one or more of the bar codes, additional information which may be read or not as desired. The invention is directed toward an object marking arrangement employing conventional bar codes or similar markings in which auxiliary information is also encoded along one or more of the discrete marks or bars and/or in the spacings therebetween in a direction parallel to the bar. The auxiliary code may be an optical one so as to be readable by an electro-optical transducer (which may be the same or different from the transducer used to read the bar code) or magnetically recorded on a magnetic medium.

In a preferred form of the invention, a bar code is printed or otherwise formed on a product, workpiece, tool or label and additional information is provided longitudinally along one or more of the bars thereof by voids in the printing effected during or after printing. A pulsed laser beam may be used to pit or remove selected portions of the material making up the bars to define one or more electro-optically readable codes which may be sequentially or simultaineously electro-optically scanned with or without electro-optically scanning the bar code itself. In another form, one or more of the bars of a bar code may be printed with ink of a different color to provide auxilliary information or may contain magnetic recording ink defining digital and/or analog recordings. Reading may be effected by line scanning laterally across one or more bars, by raster scanning normal to the bars and/or by such scanning parallel to or along the longitudinal axis of the bars with or without scanning to detect the code defined by the bar codes. Codes other than so-called bar codes may thus be scanned per se or may have coded portions thereof also scanned to provide auxiliary information in addition to the primary information defined by the bars and their spacings or other indicia.

It is therefore a primary object of the present invention to provide an object marking and coding arrangement in which bar codes, or similar optically readable markings, have auxiliary information encoded within and/or between the discrete markings making up the bar code.

It is a further object for the auxiliary information to be made up of electro-optically scannable elements such as voids, pits, or marks of different color than the bars.

It is a further object for the auxiliary information to be made up of magnetic recordings readable by a magnetic pick-up.

Other objects, features, and advantages of the invention will become evident in light of the following detailed description considered in conjunction with the referenced drawings of a preferred exemplary embodiment according to the present invention.

DETAILED DESCRIPTION OF THE INVENTION

Figure 1:
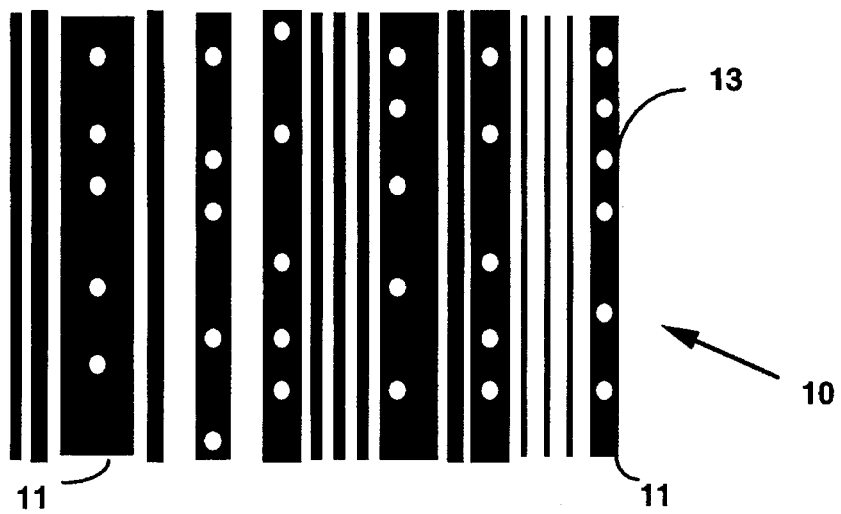
FIG. 1 shows a bar code in which the bar elements possess an electro-optically readable code consisting of reflective circular areas arranged longitudinally along the bar.

In FIG. 1 is shown a first form of the invention defined by a printed bar code 10 formed of a plurality of printed black bars 11 defining a code which is electro-optically readable by, for example, a light beam such as a laser beam, television camera, light pen or other form of reader which scans the bars sequentially in a direction transverse to the direction or orientation of the bars. Certain of the bars 11 are shown containing a series of circular areas 13 which are void of printed matter and which extend along at least one track of the bar parallel to the longitudinal axis or the bar. Such circular voids 13, which may be of any shape and size, are provided in the form of one or more information defining codes and may be of substantially smaller areas than illustrated to be read by an electro-optical reader, such as a laser scanner or TV camera operable to scan longitudinally with respect to the bars containing same. The circular areas 13 are thus arranged to be scanned in a direction generally perpendicular to the direction in which the series of bars 11 are scanned.

If the circular code defining areas or pits 13 extend along two or more parallel bars and/or two or more tracks of a bar, they may also be read by a light beam scanning normal to the bars in one or more parallel scans of the bars, either alone or while the bar code is also scanned and read.

The circular areas or pits 13 may be formed by printing material applied over the printing defining the bars or by providing voids in the ink of the bars formed by printing or by ablating such areas 13 with a computer controlled pulsed laser beam.

Figure 2:
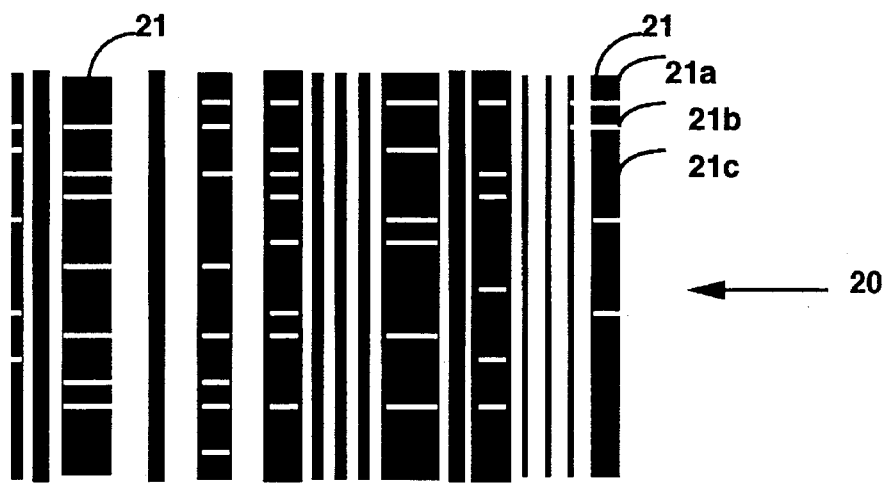
FIG. 2 shows a bar code in which the bar elements are divided into discrete segments defining an additional optical code.

In FIG. 2, a bar code 20 is formed of a plurality of printed or otherwise formed bars 21, one or more of which are divided into discrete segments 21a, 21b, 21c, etc., which define one or more codes by their spacings, lengths, or widths, etc. The bars 21 are scanned sequentially in a direction transverse to the longitudinal axis of each bar. The segments 21a, 21b, etc. are scanned sequentially in a direction generally perpendicular to the direction in which the bars 21 are scanned. Here again, the individual bars may be electro-optically scanned by a beam scanning parallel to their longitudinal axes and/or by a sensor array scanning one or more of the bars while relative scanning movement is effected normal or oblique to the bars.

Figure 3:
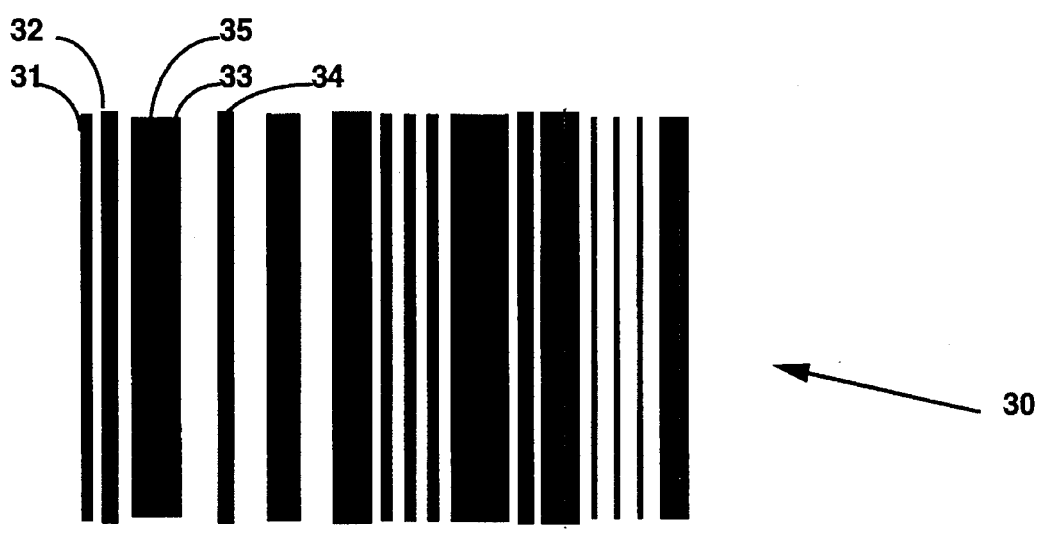
FIG. 3 shows a bar code printed with magnetic ink or otherwise formed of magnetic material with magnetically recorded code tracks running longitudinally along the bars.

In FIG. 3, a bar code 30 is provided printed with or otherwise formed of magnetic ink or other magnetic material and defined by a plurality of parallel bars 31, 32, 33, 34, etc. Magnetically recorded longitudinally along or one or more of the bars 30, such as bar 33, are a plurality of code recordings 35 to be read, as above, by a magnetic pick-up scanned parallel to and along the bars. In another embodiment, a bar code may be provided with an auxilliary code printed between two or more bars of the code of the same or different ink.

Although the invention has been described in conjunction with the foregoing specific embodiment, many alternatives, variations, and modifications will be apparent to those of ordinary skill in the art. Those alternatives, variations, and modifications are intended to fall within the scope of the following appended claims.

What is claimed is:

1. A product marking for use in encoding identification or associated information on an article of manufacture comprising:
   a) a first scannable code comprising a plurality of alternating light and dark electro-optically scannable marking elements arranged to be scanned sequentially in a first direction by a laser beam and an electro-optical detector of radiation reflected from said elements; and
   b) a second scannable code defining auxiliary coded information within at least one of said marking elements of said first code with said second code being arranged to be scanned by a transducer in a second direction generally perpendicular to the first direction in which said first code is scanned.

2. A product marking in accordance with claim 1 wherein said marking elements are elongated bars and spacings therebetween having their longitudinal axes oriented transversely to said first direction.

3. A product marking in accordance with claim 2 wherein said second code comprises a series of circular voids oriented along the longitudinal axis of at least one of said bars, said circular voids being electro-optically scannable with a laser beam.

4. A product marking in accordance with claim 2 wherein at least one of said bars is divided into discrete segments of varying widths or spacings so as to define said second scannable code, which second code is optically scannable in a direction along the longitudinal axis of the bar.

5. A product marking in accordance with claim 2 wherein said bars are formed of magnetic material with a magnetic recording track oriented along the longitudinal axis of at least one of said bars to form said second scannable code.

6. A product marking in accordance with claim 3 wherein said bars are formed of a material and said circular voids are formed by laser ablation of said bar forming material.

7. A product marking in accordance with claim 6 wherein said bar forming material is ink.

8. A product marking in accordance with claim 5 wherein a plurality of magnetic recording tracks are oriented along the longitudinal axis of at least one of said bars to form said second scannable code.

9. A method for scanning coded product marking information comprising:

electro-optically scanning in a first scanning direction a first code comprising a series of alternating light and dark marking elements; and scanning a second code contained in at least one of said marking elements, wherein said second code is scanned in a direction generally perpendicular to said first scanning direction.

10. A method in accordance with claim 9 wherein said marking elements of said first code are elongated bars having longitudinal axes oriented perpendicular to the said first scanning direction.

11. A method in accordance with claim 10 wherein said second code comprises a series of circular voids oriented along the longitudinal axis of at least one of said bars, and wherein said circular voids are electro-optically scanned with a laser beam.

12. A method in accordance with claim 10 wherein at least one of said bars is divided into discrete segments of varying widths or spacings so as to define said second scannable code, and wherein second code is optically scanned in a direction along the longitudinal axis of the bar.

13. A method in accordance with claim 10 wherein said bars are formed of magnetic material with a magnetic recording track oriented along the longitudinal axis of at least one of said bars to form said second scannable code, and further wherein said second code is magnetically scanned along said longitudinal axis.

* * * * *